(12) United States Patent
Tanner

(10) Patent No.: US 11,447,230 B2
(45) Date of Patent: Sep. 20, 2022

(54) AIRCRAFT FUEL TANK ACCESS PANEL ASSEMBLIES

(71) Applicant: The Boeing Company, Chicago, IL (US)

(72) Inventor: Richard B. Tanner, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 260 days.

(21) Appl. No.: 16/777,567

(22) Filed: Jan. 30, 2020

(65) Prior Publication Data

US 2021/0237847 A1  Aug. 5, 2021

(51) Int. Cl.
  *B64C 3/34* (2006.01)
  *B64F 5/10* (2017.01)
  *B64C 1/14* (2006.01)
(52) U.S. Cl.
  CPC .............. *B64C 3/34* (2013.01); *B64C 1/1446* (2013.01); *B64F 5/10* (2017.01)
(58) Field of Classification Search
  CPC ................................ B64C 1/1446; F16B 37/14
  See application file for complete search history.

(56) References Cited

U.S. PATENT DOCUMENTS

| | | | | |
|---|---|---|---|---|
| 3,630,403 A | * | 12/1971 | Berg | B65D 50/064 |
| | | | | 215/221 |
| 5,071,300 A | * | 12/1991 | McCauley | F16B 39/12 |
| | | | | 411/222 |
| 5,855,463 A | * | 1/1999 | Newby | F16B 39/18 |
| | | | | 411/932 |
| 6,027,294 A | * | 2/2000 | Newby | F16B 37/14 |
| | | | | 411/231 |
| 7,658,580 B1 | * | 2/2010 | Conway | A47G 3/00 |
| | | | | 411/374 |
| 8,210,785 B1 | * | 7/2012 | Gager | E03D 11/16 |
| | | | | 411/338 |
| 9,073,618 B2 | * | 7/2015 | Tanner | B64C 1/1461 |
| 10,655,667 B2 | * | 5/2020 | Stevens | F16B 39/225 |

(Continued)

FOREIGN PATENT DOCUMENTS

GB  2367600 A  *  4/2002  .............. F16B 37/14

OTHER PUBLICATIONS

U.S. Appl. No. 16/242,115, filed Jan. 8, 2019, Hansen.
U.S. Appl. No. 16/693,613, filed Nov. 25, 2019, Reyes Brondo.

*Primary Examiner* — Justin M Benedik
(74) *Attorney, Agent, or Firm* — Dascenzo Gates Intellectual Property Law, P.C.

(57) ABSTRACT

Apparatuses and methods for aircraft wings, including fuel tank access panel assemblies, are disclosed. For example, an aircraft wing comprises a skin and a load bearing fuel tank access panel assembly fastened to the skin. The skin comprises a fuel tank access panel hole and a first fastener hole. The load bearing fuel tank access panel is configured to bear at least some of a wing bending load and comprises an access panel, a fastener, and a self-locking fastener mating assembly. The access panel comprises a body portion configured to be received in the fuel tank access panel hole, and a lip portion extending over an interior surface of the skin. The lip portion comprises a second fastener hole, and the fastener extends through the first fastener hole and the second fastener hole into the self-locking fastener mating assembly.

20 Claims, 7 Drawing Sheets

(56) References Cited

U.S. PATENT DOCUMENTS

| | | | |
|---|---|---|---|
| 2008/0297967 A1* | 12/2008 | Winter | B64D 37/32 244/1 A |
| 2010/0104377 A1* | 4/2010 | Campbell | F16G 11/05 405/259.5 |
| 2012/0187247 A1* | 7/2012 | Delgado | B64C 1/1446 244/129.5 |
| 2013/0043351 A1* | 2/2013 | Kamihara | B64D 45/02 244/132 |
| 2019/0093696 A1* | 3/2019 | Stevens | B64D 45/02 |
| 2019/0111632 A1* | 4/2019 | Khosravani | B29C 70/745 |
| 2019/0285109 A1* | 9/2019 | Khosravani | B22F 9/04 |
| 2020/0011368 A1* | 1/2020 | Mahaffey | F16B 37/14 |
| 2021/0071703 A1* | 3/2021 | Mahaffey | F16B 33/004 |

* cited by examiner

AIRCRAFT FUEL TANK ACCESS PANEL ASSEMBLIES

FIELD

The present disclosure relates to aircraft fuel tank access panel assemblies.

BACKGROUND

Fuel tank access doors are only opened to conduct maintenance and/or inspections of the systems inside the fuel tank, conduct structural inspections, and/or to fix fuel leaks. These fuel tank access panels are also located on the underside of the aircraft's wings, but the wings may include many of them spaced along the length of the wing to allow access to different areas of the fuel tank. To prevent fuel from spilling out the open fuel tank access panels, the fuel tanks are usually emptied before opening the access panels. Once empty and purged, maintenance personnel may then enter the empty fuel tanks via the open access panels to inspect the fuel tanks for cracks, fissures, leaks, etc. During normal operation, when the access panels are closed, they must provide a sufficient seal with the wing skin to prevent fuel escape.

Current fuel tank access panels are non-structural and do not react wing bending loads (i.e., they are not load bearing) and are not fastened directly to the wing skin with fasteners that extend through the wing skin. In particular, fasteners are not inserted through the composite wing skin using current approaches because doing so jeopardizes electromagnetic effects (EME) performance. Moreover, because the access panels are not fastened directly to the wing skin, the wing skin is thicker to meet load requirements. Thicker wing skins are heavier and more costly, leading to aircraft that are more expensive and less fuel-efficient. Further, current fuel tank access panel assemblies include both inner and outer panels, increasing the complexity and cost of such access panel assemblies. Thus, cheaper and less complex structural fuel tank access panels that bear some of the wing bending loads while also providing sufficient EME protection are desired.

SUMMARY

Apparatuses and methods for aircraft wings, including fuel tank access panel assemblies, are disclosed.

For example, an access panel assembly for an aircraft wing comprises an access panel and a self-locking fastener mating assembly. The access panel comprises a hole configured to receive a fastener, and the self-locking fastener mating assembly comprises a cap assembly and a washer. The cap assembly comprises a nut and an external cap that at least partially surrounds the nut. The nut comprises internal nut threads that mate with the fastener, and the external cap comprises an internal locking structure that restricts rotation of the nut relative to the external cap. The external cap further comprises internal cap threads of an opposite handedness as the internal nut threads of the nut. The washer is fixedly coupled to the access panel and comprises external threads that mate with the internal cap threads of the external cap.

As another example, an aircraft wing comprises a skin and a load bearing fuel tank access panel assembly fastened to the skin. The skin comprises a fuel tank access panel hole configured to receive a fuel tank access panel and a first fastener hole configured to receive a fastener. The load bearing fuel tank access panel assembly comprises an access panel and a self-locking fastener mating assembly operatively coupled to the access panel. The access panel comprises a body portion that is configured to be received in the fuel tank access panel hole, and a lip portion that extends over an interior surface of the skin. The lip portion comprises a second fastener hole that is configured to receive the fastener. In one example, the second fastener hole is positioned over the first fastener hole of the wing skin such that they are substantially aligned. The self-locking fastener mating assembly is operatively coupled to the lip portion above the second fastener hole and is configured to receive and secure the end of the fastener. In some examples, the first and second fastener holes include electrically conductive gap fillers.

In yet another example, a method comprises coupling a fastener mating assembly to an access panel prior to fastening the access panel to a skin of an aircraft wing. The coupling the fastener mating assembly to the access panel comprises fixedly coupling a washer comprising external washer threads of a first handedness to an interior-facing surface of the access panel, and threading a cap of a cap assembly onto the external washer threads of the washer from the interior-facing surface of the access panel by rotating the cap in a first rotational direction such that the cap translates in a first axial direction towards the access panel.

DESCRIPTION

Figure 6:
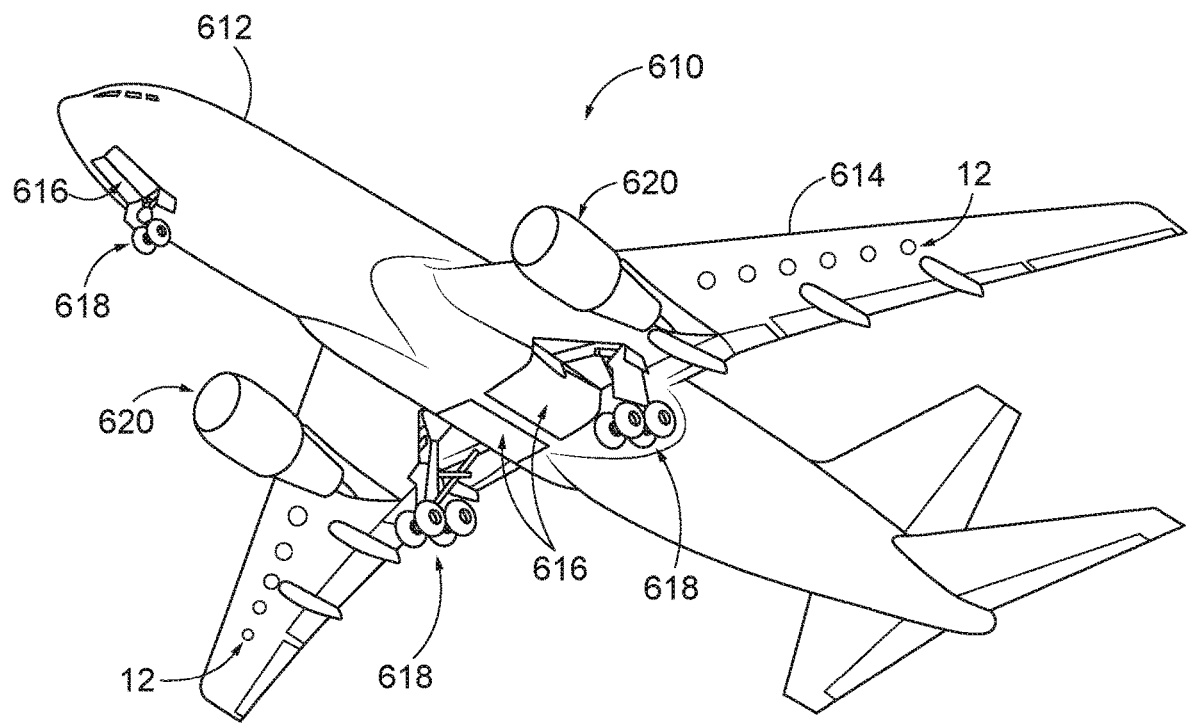
FIG. 6 is a schematic representation of an example aircraft that includes several underwing fuel tank access panel assemblies, according to the present disclosure.
Figure 7:
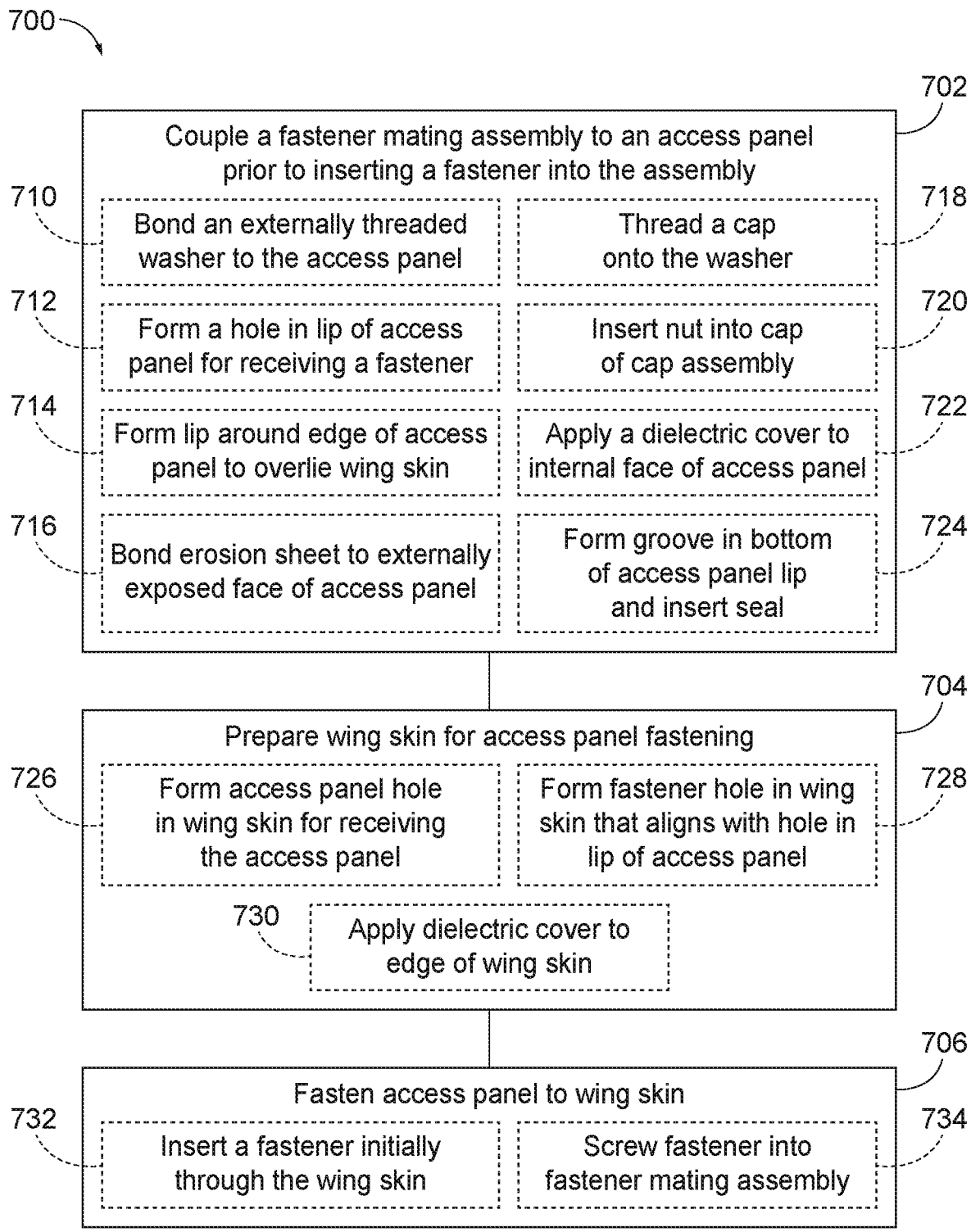
FIG. 7 is a flowchart schematically representing methods for installing a fuel tank access panel assembly on an aircraft wing, according to the present disclosure.

Fuel tank access panel assemblies and related methods are disclosed. FIGS. 1-5 illustrate various examples of fuel tank access panel assemblies. FIG. 6 illustrates example underwing locations where fuel tank access panel assemblies may be installed, and FIG. 7 illustrates example methods for manufacturing, assembling, and installing the fuel tank access panel assembly. The fuel tank access panel assemblies of the present disclosure include a self-locking fastener mating assembly that is coupled to the access panel. Such an access panel assembly is lighter, cheaper, and easier to manufacture and/or assemble than conventional fuel tank access panels that comprise integral fastener bosses on an inner access panel. The fuel tank access panel assemblies of the present disclosure may additionally or alternatively be a structural access panel assembly that may bear at least some of the wing bending load. In particular, an access panel assembly may be configured to be fastened to the wing skin while also providing sufficient electromagnetic effects (EME) protection. By bearing at least some of the wing bending load, the structural access panel assembly may allow the wing skin to be thinner and lighter than conventional wing skins comprising non-structural access panel assemblies. In this way, the fuel tank access panel assemblies of the present disclosure reduce aircraft fuel consumption and cost. Further, because the access panel assemblies of the present disclosure do not require separate inner and outer access panels, the complexity and cost of the access panel assemblies are reduced.

Beginning with FIG. 1, it illustrates a schematic representation of a load bearing fuel tank access panel assembly 12 (hereinafter "fuel tank access panel assembly 12" and/or "access panel assembly 12") that may be fastened to a skin 40 of an aircraft wing 10. Generally, in FIG. 1, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

In particular, in addition to a conventional access panel hole that receives the access panel assembly 12, the skin 40, when included, also includes a fastener hole 52 that is configured to receive a fastener 34. Because the fastener hole 52 and/or the fastener 34 may be coated with an electrically conductive material, the skin 40 may directly accept the fastener 34 through the fastener hole 52, thus allowing the access panel assembly 12 to be fastened to the skin 40 while still providing sufficient EME protection. By fastening to the skin 40, the access panel assembly 12 may bear at least some of the wing bending load (thus, the access panel assembly 12 may also be referred to as "load bearing fuel tank access panel assembly 12"), allowing the aircraft wing 10 to be thinner, lighter, and less expensive than aircraft wings having non-structural access panels. Further, because the access panel assembly 12 may include only a single access panel (e.g., access panel 13) the access panel assembly 12 may be cheaper and less complex than access panel assemblies including inner and outer access panels on either side of the skin 40.

The access panel assembly 12 comprises an access panel 13 and a self-locking fastener mating assembly 14 coupled to the access panel 13. The access panel 13 includes a hole 53 configured to receive a fastener 34, and the self-locking fastener mating assembly 14 is positioned over the hole 53 and is configured to receive and secure the end of the fastener 34. When included, the skin 40 includes the fastener hole 52 that is configured to receive the fastener 34, in addition to a fuel tank access panel hole 45 (also referred to as "access panel hole 45") that is configured to receive the access panel 13. When assembled, the access panel assembly 12 and the skin 40 are configured to permit the fastener 34 to extend through the fastener hole 52 of the skin 40 and the hole 53 of the access panel 13 (e.g., the fastener hole 52 and the hole 53 are substantially aligned), into the self-locking fastener mating assembly 14 of the access panel assembly 12. In this way, the access panel 13 may fasten to the skin 40. Further, the self-locking fastener mating assembly 14 is configured to secure the fastener 34 without the use of an external holding tool such as a wrench, thus allowing the fastener 34 to be installed from only one side (e.g., the exterior side) of the skin 40, hence the "self-locking" aspect of the self-locking fastener mating assembly 14. That is, because the self-locking fastener mating assembly 14 does not need to be held while installing the fastener 34, the fastener 34 may be installed by a user and/or machine just by torquing the fastener 34.

In particular, in some examples, the self-locking fastener mating assembly 14 comprises a washer 20 and a cap assembly 16, and the cap assembly 16 comprises a nut 18 and an external cap 17. The washer 20 is fixedly coupled to (i.e., does not move relative to) the access panel 13, and thus anchors the self-locking fastener mating assembly 14 to the access panel 13. The cap assembly 16 and its components may not be fixedly secured to the access panel 13, but nonetheless lock up with the fixedly secured washer 20 to hold the nut 18 in place while the fastener 34 is threaded through the nut 18. In particular, torquing the fastener 34 tightens the external cap 17 against the washer 20, thus restricting relative motion between the external cap 17 and the washer 20. The external cap 17 in turn comprises an internal locking structure 22 that prevents rotation of the nut 18 relative to the external cap 17 by more than a threshold amount. Thus, the self-locking fastener mating assembly 14 is self-locking in that torquing the fastener 34 increases the holding power of the external cap 17 by tightening the external cap 17 against the anchored washer 20. In particular, torquing the fastener 34 urges the external cap 17 and the washer 20 into a more locked relationship where relative rotation between the two is further restricted. Thus, the more the fastener 34 is torqued, the less the washer 20 permits the external cap 17 to move, and thus the stronger the external cap 17 holds the nut 18.

Figure 1:
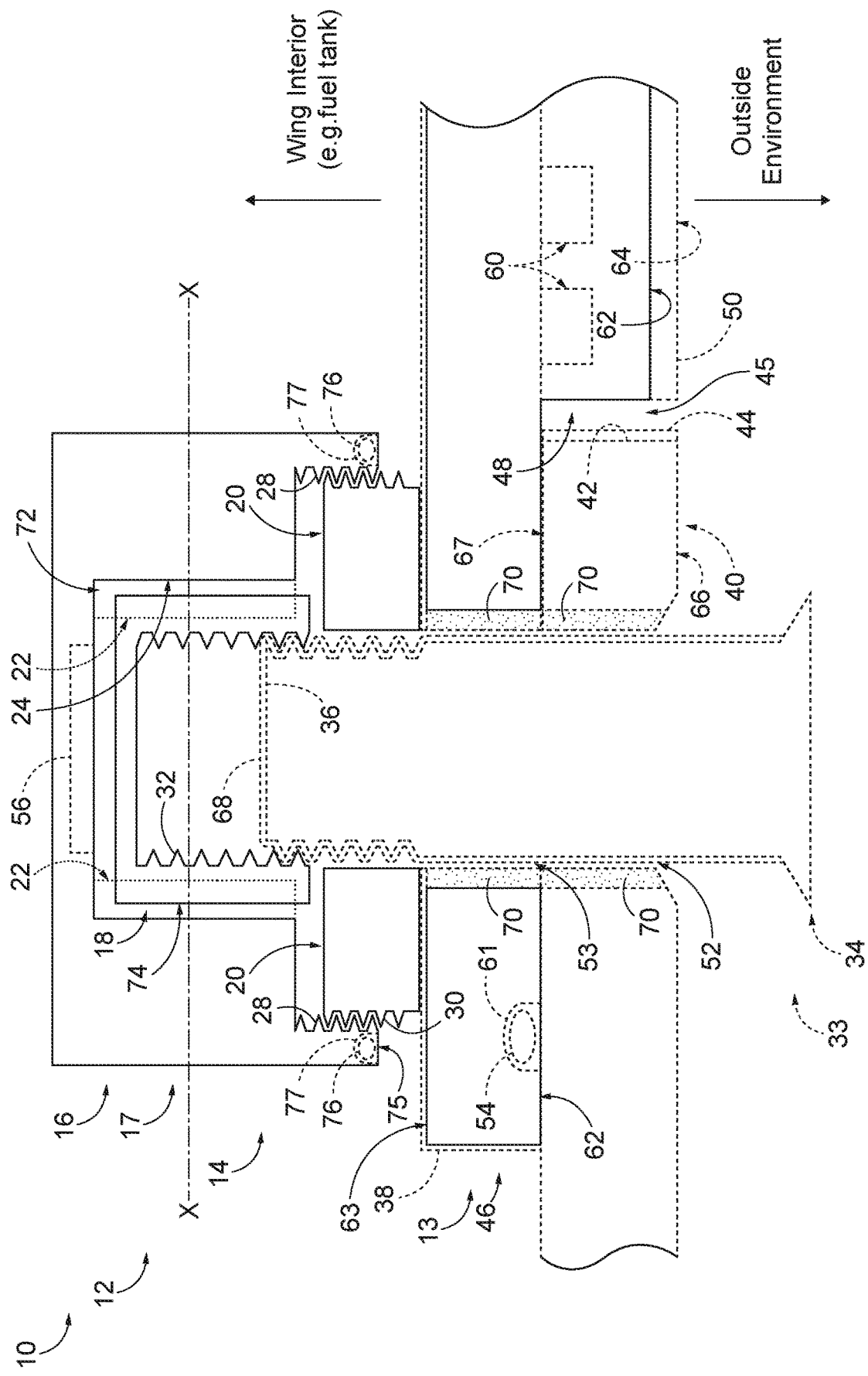
FIG. 1 is a schematic representation of a fuel tank access panel assembly, according to the present disclosure.

As illustrated in FIG. 1, the external cap 17 defines an interior volume 72 within which the nut 18 is positioned. Thus, the external cap 17 at least partially surrounds the nut 18. In particular, the external cap 17 comprises an internal surface 24 that defines the interior volume 72. At least a portion of the internal surface 24 faces an external surface 74 of the nut 18 and defines the internal locking structure 22. The internal locking structure 22 is configured to restrict relative rotation of the nut 18. In particular, in one example, the internal locking structure 22 completely prevents relative rotation between the external cap 17 and the nut 18. However, in another example, the external cap 17 may permit the nut 18 to rotate relative to the external cap 17 up to a certain amount (i.e., threshold relative rotation angle), but may prevent relative movement of the nut 18 beyond this allowable amount. In such an example, the nut 18 is a floating nut that is permitted some freedom of movement within the external cap 17. However, this freedom of movement is limited. In particular, the external cap 17 limits this freedom of movement to a threshold relative rotation angle, and beyond this threshold freedom of movement, the external cap 17 completely prevents relative movement of the nut 18.

Figure 2:
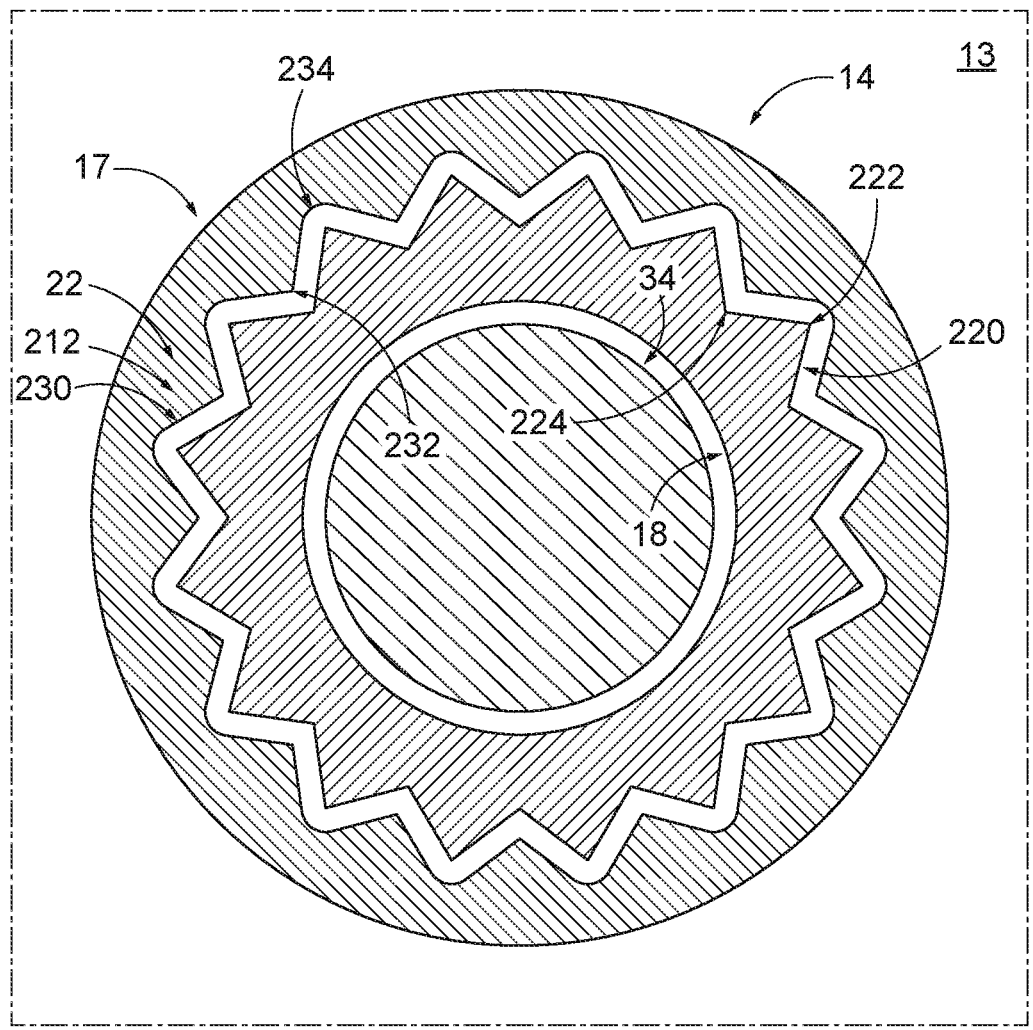
FIG. 2 is a cross-sectional schematic representation of the fuel tank access panel assembly of FIG. 1 taken along cutting plane X-X.

In some examples, the internal locking structure 22 comprises a tooth, cam, or other type of projection that interacts with the external surface 74 of the nut 18 to prevent and/or restrict rotation of the nut 18 relative to the external cap 17. In some examples, the external surface 74 of the nut 18 is non-circular such that at least a portion of the external surface 74 interacts with (e.g., abuts) the internal locking structure 22 to restrict rotation of the nut 18 relative to the external cap 17. FIG. 2 illustrates one particular example of the internal locking structure 22 and the interface between the internal locking structure 22 and the external surface 74 of the nut 18.

The external cap 17 is operatively and/or removably coupled to the washer 20. When the external cap 17 is coupled to the washer 20, the external cap 17 and washer 20 retain the nut 18 within the interior volume 72 of the external cap 17. In one example, the external cap 17 is coupled to the washer 20 via a threaded engagement. Thus, in such examples, the external cap 17 is threaded onto the washer 20 to couple the external cap 17 to the washer 20. In some such examples, the external cap 17 comprises internal cap threads 28 on the internal surface 24 that mate with external threads 30 (also referred to as "external washer threads 30") of the washer 20. However, in other examples, the internal cap threads 28 are alternatively included on an exterior surface of the external cap 17, opposite the internal surface 24. In such examples, the washer 20 surrounds the external cap 17 and includes threads on an internal surface that face the threads of the external cap 17. Thus, the threads of the external cap 17 and the washer 20 interface and mate with one another, regardless of the specific orientation of the external cap 17 and the washer 20. The internal cap threads 28 comprise at least one thread sufficient to operatively retain the external cap 17 on the washer 20.

In some examples, the external cap 17 is at least partially threaded onto the washer 20 when the self-locking fastener mating assembly 14 is assembled, prior to fastener insertion. This helps prevent undesirable cap decoupling during fastener installation. That is, pushing the fastener 34 against the nut 18 during installation will not cause the external cap 17 to translate axially away and/or decouple from the washer 20 because the external cap 17 is at least partially threaded onto the washer 20. Thus, backwards translation (axially translating away from the washer 20) of the external cap 17 due to axial pushing or pulling forces may be prevented via the threaded engagement of the external cap 17 and the washer 20.

As mentioned above, the washer 20 is fixedly coupled to the access panel 13. In the description herein, "fixedly coupled" refers to a coupling between two or more components in which the components cannot move relative to one another once coupled. For example, two components that are glued together may be fixedly coupled to one another. Thus, the washer 20 is not configured to move relative to the access panel 13, and is in a fixed position relative to the access panel 13. As one example, the washer 20 is bonded to the access panel 13 by way of heat, pressure and/or an adhesive such as glue. In some examples, the washer 20 is directly coupled to the access panel 13 such that no intervening structure exists between the washer 20 and the access panel 13 (i.e., the washer 20 directly abuts and contacts the access panel 13). However, in other examples, one or more components and/or structures are included between the washer 20 and the access panel 13. As one such example, one or more spacers or other components, such as a dielectric cover, may be included between the washer 20 and the access panel 13. However, when included, one or more optional intervening structures are fixedly coupled to the access panel 13, and the washer 20 is in turn fixedly coupled to these one or more fixedly secured intervening structures. In this way, the washer 20 remains fixedly coupled to the access panel 13, even when one or more intervening structures are included between the washer 20 and the access panel 13.

As illustrated in FIG. 1, in some examples, the internal cap threads 28 of the external cap 17 are set out from and/or below the internal locking structure 22. Thus, in such examples, the nut 18 and the internal locking structure 22 are positioned above the washer 20 and the internal cap threads 28 of the external cap 17. As used herein, the term "above" refers to a position more proximate the wing interior, and the term "below" refers to a position more proximate the outside environment (i.e., exterior of the wing skin 40). Thus, when included, the internal surface 24 of the external cap 17 comprises the internal locking structure 22 and the internal cap threads 28. That is, the internal locking structure 22 and the internal cap threads 28 define different portions of the internal surface 24 of the external cap 17. In particular, in some such examples, such as the example shown in FIG. 1, the internal locking structure 22 defines a portion of the internal surface 24 that is positioned above the portion of the internal surface 24 defined by the internal cap threads 28.

In some examples, the self-locking fastener mating assembly 14 further comprises a sealant 76 at a bottom 75 of the external cap 17. When included, the sealant 76 is positioned between the external cap 17 and the access panel 13 to provide a seal therebetween. In particular, in some such examples, the external cap 17 comprises a groove 77 on the bottom 75 of the external cap 17 that at least partially retains the sealant 76. When included, the groove 77 is included on the bottom 75 of the external cap 17 and in some examples, extends around the circumference and/or periphery of the bottom 75 of the external cap 17. The sealant 76 is injected or otherwise inserted into the groove 77.

In some examples, the self-locking fastener mating assembly 14 further comprises an ice prevention structure 56, positioned within the interior volume 72 of the external cap 17. The ice prevention structure 56 is configured to prevent ice buildup on and/or in the cap assembly 16 by restricting and/or preventing water from accumulating in the interior volume of the external cap 17 while still permitting the fastener 34 to engage and thread into the nut 18. In some such examples, the cap assembly 16 includes the ice prevention structure 56 above the nut 18 or between the nut 18 and the external cap 17. Thus, in such examples, the ice prevention structure 56 is positioned on a side of the nut 18 opposite the washer 20. In some examples, the ice prevention structure 56 is coupled to and/or at least partially embedded in, the external cap 17. In other examples, the ice prevention structure 56 is free floating above the nut 18. The ice prevention structure 56 may be constructed from a solid foam, such as a closed-cell foam, in some examples. In some examples, the ice prevention structure 56 is donut-shaped.

The nut 18 comprises the external surface 74 that interfaces with the internal locking structure 22 of the external cap 17. Opposite the external surface 74, on an interior surface, the nut 18 comprises internal nut threads 32 that are configured to mate with external fastener threads 36 of the fastener 34. Thus, the fastener 34 is configured to thread into the nut 18 via the mating threads of the fastener 34 and the nut 18.

When included, the internal nut threads 32 of the nut 18 are of an opposite handedness as the internal cap threads 28 of the external cap 17. For example, if the internal nut threads 32 are right-handed, then the internal cap threads 28 are left-handed, and vice versa. This opposite handedness in the threading of the nut 18 and the external cap 17 biases the fastener 34 and external cap 17 in opposite axial directions. For example, tightening the fastener 34 (e.g., torquing in a clockwise direction for a right-handed fastener) urges the fastener 34 farther into the nut 18, towards the external cap 17, and/or urges the external cap 17 to thread farther onto the washer 20, towards the fastener 34. Thus, torquing the fastener 34 in a tightening direction (e.g., a clockwise direction for a right-handed fastener 34) brings the fastener 34 and the external cap 17 closer together.

When the external cap 17 is only partially threaded onto the washer 20, torquing the fastener 34 in a tightening direction may thread the external cap 17 farther onto the washer 20 depending on the relative amount of friction between the fastener 34 and the nut 18 versus between the external cap 17 and the washer 20. In particular, when the frictional forces resisting the threading of the external cap 17 farther onto the washer 20 are less than the frictional forces resisting the threading of the fastener 34 farther into the nut 18, torquing the fastener 34 in a tightening direction may thread the external cap 17 farther onto the washer 20. Stated another way, when the force required to turn the fastener 34 relative to the nut 18 is greater than the force required to turn the external cap 17 relative to the washer 20, the external cap 17 may thread farther onto the washer 20, and vice versa. Thus, whether torquing the fastener 34 causes the fastener 34 to thread farther into the nut 18 or causes the external cap 17 to thread farther onto the washer 20 may depend on the balance of the frictional forces between the fastener 34 and the nut 18 versus the external cap 17 and the washer 20.

In this way, the self-locking fastener mating assembly 14 is "self-locking" in that it locks up and holds the nut 18 in place responsive to torquing of the fastener 34. That is, torquing the fastener 34 increases the holding power of the self-locking fastener mating assembly 14 because torquing the fastener 34 tightens the external cap 17 against the washer 20. When the fastener 34 first engages the internal nut threads 32 of the nut 18, the rotating fastener naturally causes the nut 18 to spin if nothing is holding the nut 18 in place. But, because the rotation of the nut 18 is restricted by the internal locking structure 22 of the external cap 17, the nut 18 may not spin more than a threshold amount unless the external cap 17 also spins. However, the external cap 17 is also restricted from rotating (and axially translating) by the washer 20. In particular, and as explained above, even when the external cap 17 is only partially threaded onto the washer 20, the frictional forces between the external cap 17 and the washer 20 may be sufficient to hold the external cap 17 (and thus the nut 18) in place while the fastener 34 is threaded into the nut 18. Further, once the external cap 17 is fully threaded onto the washer 20, the external cap 17 is no longer free to spin and thus holds the nut 18 in position regardless of the amount of torque applied to the fastener 34 (up to the shearing strength of the components of the self-locking fastener mating assembly 14 and/or bond strength of the bond between the washer 20 and access panel 13). This is because the amount that the external cap 17 may translate forward, toward the washer 20, physically is restricted by the washer 20 itself. In particular, the external cap 17 may thread onto the washer 20 until it hits/abuts the washer 20, at which point it may lock up with the washer 20. That is, the washer 20 may stop the external cap 17 from translating any farther axially (and thus stop rotation of the external cap 17) once the external cap 17 reaches, directly abuts, and/or fully compresses against the washer 20, because the external cap 17 simply cannot get any closer to the washer 20. In other words, once it is fully threaded onto the washer 20, such that it is clamped against the washer 20, the external cap 17 may no longer rotate relative to the washer 20 because the washer 20 may prevent the external cap 17 from translating axially any closer. This may be referred to herein as the external cap 17 "locking up" with the washer 20.

Since the washer 20 is fixedly coupled to the access panel 13, it does not rotate relative to the access panel 13. Thus, when the external cap 17 is locked up with the washer 20, the external cap 17 does not rotate relative to the washer 20. And, as explained above, because the external cap 17 includes the internal locking structure 22, the nut 18 also does not rotate relative to the external cap 17 and/or it does not rotate more than the limited allowable amount relative to the external cap 17 when the external cap 17 is stationary. Thus, when the external cap 17 is held in place by the washer 20 (i.e., when the external cap 17 locks up with the washer 20), the external cap 17 may in turn hold the nut 18 in place via the internal locking structure 22, thereby allowing the fastener 34 to be threaded farther into the nut 18. In this way, the external cap 17 and washer 20 hold the nut 18 in place and allow the fastener 34 to be threaded into the nut 18 without requiring the use of an external tool such as a wrench. Thus, the washer 20 and external cap 17 effectively form a nut-holding mechanism that is fully self-contained within the self-locking fastener mating assembly 14. By including its own internal nut-holding mechanism, the self-locking fastener mating assembly 14 enables one-sided fastener installation (e.g., installation from only the exterior side of the skin 40). Further, because the self-locking fastener mating assembly 14 may be separately coupled to the access panel 13, the access panel 13 may not need to include integral fastener bosses. Thus, the self-locking fastener mating assembly 14 may be constructed from a different, lighter and/or cheaper material than the access panel 13, thus reducing the weight and/or cost of the access panel assembly 12.

In particular, the external cap 17 is constructed from a polyamide such as Trogamid®, in some examples. However, in other examples, the external cap 17 is constructed from another type of plastic such a polyethylene, polypropylene, polyurethane, and polyvinyl chloride. In yet further examples, the external cap 17 is constructed from a metal and/or a metal alloy. In still further examples, the external cap 17 is constructed from a combination of one or more of the above materials. Further, without integral fastener bosses, the access panel 13 may be constructed such that it is substantially flat and/or planar, as illustrated in FIG. 1. In particular, interior-facing surface 63 of the access panel 13 is substantially flat and/or planar, in some examples. This flat and/or planar geometry may be easier to manufacture than one with raised, integral fastener bosses. Thus, producing and/or manufacturing the access panel 13 may be easier and cheaper than conventional access panels including integral fastener bosses.

Opposite the interior-facing surface 63, the access panel 13 comprises an exterior-facing surface 62, in some examples. In some examples, the access panel 13 comprises a lip 46 (also referred to herein as "lip portion 46") and a body 48 (also referred to herein as "body portion 48"), that define different portions of the exterior-facing surface 62. In particular, when included, the body 48 is configured to be received in the access panel hole 45 of the skin 40, and the lip 46 is configured to extend over the skin 40, on top of an interior surface 67 of the skin 40. This overlapping configuration of the skin 40 and access panel 13 allows the access panel 13 to be fastened the skin 40. In particular, and as described above, the lip 46 of the access panel 13 is fastened to the skin 40 via fastener 34, in some examples.

Thus, in some such examples, the access panel 13 comprises the hole 53 that is configured to receive the fastener 34. The hole 53 is drilled, reamed, cut, or otherwise formed in the access panel 13, and extends from the exterior-facing surface 62 of the lip 46 of the access panel 13 to the interior-facing surface 63 of the access panel 13 to permit the fastener 34 to pass through the access panel 13 and into the self-locking fastener mating assembly 14.

In some examples, such as when the access panel 13 comprises a fiber reinforced plastic material, an electrically conductive gap filler (ECGF) 70 (also referred to as "conductive gap filler 70") is applied to sidewalls of the hole 53 of the access panel 13. The ECGF 70 comprises an electrically conductive material such as one or more of bismuth, indium, tin, nickel, and zinc. The ECGF 70 is applied to the sidewalls of the hole 53 by one or more of abrading, injecting, and spraying the ECGF 70. One example abrading technique includes the use of a split mandrel tool cast with a low melting alloy (LMA) as described in commonly-owned U.S. patent application Ser. No. 15/923,630 entitled "METHOD, APPARATUS AND APPLICATOR FOR APPLYING A COATING ON A SURFACE OF A LAMINATION," the disclosure of which is incorporated by reference herein in its entirety. One example injection technique includes injecting molded LMA in the hole 53, and is described in commonly-owned U.S. patent application Ser. No. 15/786,665 entitled "APPARATUS AND METHODS FOR INJECTING FILLER MATERIAL INTO A HOLE IN A COMPOSITE LAYER", the disclosure of which is incorporated by reference herein in its entirety.

In some examples, the lip 46 and the body 48 are integrally formed together during manufacture of the access panel 13. That is, in such examples, the lip 46 and the body 48 are not separate components that are coupled together, but rather are formed together as an integral unit during manufacture of the access panel 13. In one such example, the lip 46 is formed by cutting and/or machining a recess into access panel 13, along a periphery of the access panel 13. Thus, in such examples, the access panel 13 is initially manufactured such that the exterior-facing surface 62 is substantially flat and/or planar. The periphery of the exterior-facing surface 62 is then cut and/or machined to form lip 46.

In some examples, the access panel 13 additionally or alternatively comprises one or more voids 60. In some such examples, the one or more voids 60 are included in the body 48 of the access panel 13. The one or more voids 60 are empty spaces that comprise only air, in some examples. In some such examples, the one or more voids 60 are created by removing (machining and/or cutting out) portions of the access panel 13. Thus, the exterior-facing surface 62 of the body 48 is cut and/or machined to form the voids 60, in such examples. However, in other examples, the one or more voids 60 are integrally formed during the molding process.

The access panel 13 is constructed from composite fiber-reinforced materials, in some examples. As one such example, the access panel 13 comprises carbon fiber reinforced plastic (CFRP). However, in other examples, the access panel additionally or alternatively includes a different type of fiber reinforced plastic or other material. In one such example, the access panel 13 additionally comprises a dielectric cover 38. The dielectric cover 38 is electrically insulating and is configured to prevent and/or minimize edge glow (i.e., electron ejection and/or sparking) during a lightning strike. In on example, the dielectric cover 38 comprises a glass fiber reinforced plastic (e.g., fiberglass). However, in other examples, the dielectric cover 38 comprises another electrically insulating material. The dielectric cover 38 wraps the edge of the lip 46 such that it extends from the interior-facing surface 63 of the access panel 13, to the exterior-facing surface 62 of the access panel 13. In some examples, the dielectric cover 38 covers the entirety of the interior-facing surface 63, while in other examples, it covers less than the entirety of the interior-facing surface 63, but sufficiently beyond the hole 53 and the self-locking fastener mating assembly 14. In some further examples, the access panel 13 additionally and/or alternatively comprises one or more metals or metal alloys.

In some examples, the access panel assembly 12 further comprises an erosion cover 50 coupled to the exterior-facing surface 62 of the access panel 13. The erosion cover 50 is configured to be resistant to erosion. As one example, the erosion cover 50 is constructed from titanium. As another example, the erosion cover 50 is additionally or alternatively constructed from aluminum and/or steel. However, in yet further examples, the erosion cover 50 is additionally or alternatively constructed from one or more different erosion-resistant metals, materials, or coatings. The erosion cover 50 is coupled to the body 48 of the access panel 13 at the exterior-facing surface 62, in some examples. Thus, in examples where the body 48 includes the one or more voids 60, the erosion cover 50 fully covers and/or seals the one or more voids 60. In some such examples, the erosion cover 50 covers the exterior-facing surface 62 of the body 48 of the access panel 13 but is not included elsewhere along the exterior-facing surface 62 of the access panel (e.g., at the lip 46). The erosion cover 50 is bonded to the body 48 in some examples by one or more of heat, pressure, and/or adhesives. In other examples, the erosion cover 50 is mechanically coupled to the body 48 by fasteners or other mechanical devices. When included, the exterior-facing surface 62 of the erosion cover 50 forms an exterior cover surface 64 of the access panel assembly 12. In some examples, the exterior cover surface 64 aligns with exterior surface 66 of the skin 40, such that the exterior cover surface 64 of the erosion cover 50 is flush with the exterior surface 66 of the skin 40.

In some examples, the access panel assembly 12 additionally comprises a seal 54 positioned between the access panel 13 and the skin 40. The seal 54 is configured to provide a fluid seal between the access panel 13 and the skin 40 to prevent fluid (e.g., fuel) escape. Thus, the seal 54 fluidly seals off the interior of the aircraft wing 10 (including the fuel system) from the outside environment when the skin 40 and the access panel 13 are fastened to one another. In some such examples, the access panel 13 includes a peripheral groove 61 on the exterior-facing surface 62 that is configured to receive and/or retain the seal 54. In some examples, the peripheral groove 61 extends around a periphery of the lip 46 and/or comprises a substantially circular groove. The peripheral groove 61 is formed by machining the exterior-facing surface 62 of the access panel 13, in some examples. However, in other examples, the peripheral groove 61 is formed by cutting out or otherwise removing a portion of the access panel 13 from the exterior-facing surface 62. In yet further examples, the peripheral groove 61 is integrally formed in the exterior-facing surface 62 of the access panel 13 during the molding process.

As discussed above, the skin 40 of the aircraft wing 10 is configured to receive the access panel assembly 12. In particular, when included, the skin 40 comprises the access panel hole 45 and the fastener hole 52. The access panel hole 45 is configured to receive the body 48 of the access panel 13 and the fastener hole 52 is configured to receive the fastener 34. In some examples, the access panel hole 45 and the fastener hole 52 extend all the way through the skin 40, between the exterior surface 66 of the skin 40 and the interior surface 67 of the skin 40. In some examples, ECGF 70 is applied to the sidewalls of the fastener hole 52 of the skin 40 in the same or similar manner as it may be applied to the sidewalls of the hole 53 of the access panel 13 (described above). As one such example, the ECGF 70 is applied to the skin 40 at the sidewalls of the fastener hole 52 in examples where the skin 40 comprises a composite fiber reinforced plastic such as CFRP. Applying the ECGF 70 to the fastener holes of the skin 40 and/or the access panel 13, increases electric conductivity between the fastener 34 and the sidewalls of these holes. By increasing the current pathways between the fastener 34 and the skin 40 and/or access panel 13, the aircraft wing 10 reduces current concentration and minimizes sparking and/or heating of the components of the aircraft wing 10.

In some examples, a dielectric cover 44 is applied to the skin 40. Like dielectric cover 38 that may be included on the edge of the access panel 13, the dielectric cover 44 is constructed from an electrically insulating material and is configured to minimize and/or prevent edge glow on the edge of the skin 40, proximate the access panel 13. In particular, the dielectric cover 44 comprises glass fiber reinforced plastic and/or other electrically insulating material, in some examples. Examples of electrically insulating materials other than glass fiber reinforced plastic include nylon and phenolic.

The dielectric cover 44 is included on edge 42 of the access panel hole 45 of the skin 40, between the skin 40 and the body 48 of the access panel 13. Thus, when included, the dielectric cover 44 covers the edge 42 of the skin 40 and separates the skin 40 from the body 48 of the access panel 13. In some such examples, the dielectric cover 44 extends from the interior surface 67 of the skin 40 to the exterior surface 66 of the skin 40. In some further such examples, the dielectric cover 44 extends over the top of the interior surface 67 of the skin 40. Additionally or alternatively, the dielectric cover 44 is substantially flush with the exterior surface 66 of the skin 40 such that it does not extend past the exterior surface 66. However, in other examples, the dielectric cover additionally or alternatively extends and/or wraps over the exterior surface 66. The dielectric cover 44 is bonded or otherwise coupled to the skin 40, in some examples. As one such example, the dielectric cover 44 comprises a bonded fiberglass ply.

When fastener 34 is included in the aircraft wing 10, the fastener 34 and the self-locking fastener mating assembly 14 form a fastener assembly 33. Thus, the fastener assembly 33 comprises the fastener 34 and the self-locking fastener mating assembly 14. Together, the fastener 34 and the self-locking fastener mating assembly 14 are configured to fasten the access panel 13 to the skin 40. In particular, to fasten the access panel 13 to the skin 40, the fastener 34 extends through the fastener hole 52 of the skin 40, through hole 53 of the access panel 13, and then into the self-locking fastener mating assembly 14. As explained above, the self-locking fastener mating assembly 14 is configured to hold the nut 18 in place, thus allowing the fastener 34 to be installed from only the outside of the aircraft wing 10.

More specifically, when the access panel assembly 12 is assembled with the skin 40, the hole 53 of the access panel 13 and the fastener hole 52 of the skin 40 are substantially aligned to permit the fastener 34 to extend therethrough. Thus, to fasten the access panel assembly 12 to the skin 40, the fastener 34 is first inserted into the fastener hole 52 of the skin 40 from the exterior side of the skin 40 (from exterior surface 66) and then into the hole 53 of the access panel 13, and then into the self-locking fastener mating assembly 14. The protruding end of the fastener 34 extends into the nut 18 and is torqued to thread the fastener 34 into the nut 18. Torquing the fastener 34 compresses the access panel 13 and the skin 40, and together with the seal 54, provides a sufficient seal between the inside and outside of the aircraft wing 10 to prevent fuel escape from the interior of the aircraft wing 10. Further, by fastening the access panel assembly 12 directly to the skin 40, the access panel assembly 12 may bear some of the bending loads of the aircraft wing 10, allowing the aircraft wing 10 to be thinner and lighter than aircraft wings comprising non-structural fuel tank access panels. Further, because the access panel 13 may be fastened directly to the skin 40, the access panel assembly 12 may not need multiple access panels (e.g., inner and outer access panels) that sandwich the skin 40. As a result, the access panel assembly 12 may be less complex (comprise fewer parts) than conventional access panel assemblies comprising more than one access panel, thereby reducing the cost of the access panel assembly 12.

In some examples, the fastener 34 comprises an electrically conductive coating 68 on at least the external fastener threads 36. In some such examples, the electrically conductive coating 68 is applied to the entire fastener 34, including an entire shank of the fastener 34. When included, the electrically conductive coating 68 is made from one or more of tin, zinc, bismuth, indium, or combinations of alloys thereof, and is applied to the fastener 34 using one or more of vacuum deposition, electroplating, and thermal spray processing. Methods and apparatus for coating the fastener 34 with a conducting coating are described in commonly-owned U.S. patent application Ser. No. 16/693,613, entitled "METHOD FOR PLATING A METALLIC MATERIAL ONTO A TITANIUM SUBSTRATE," and U.S. patent application Ser. No. 16/242,115, entitled "CONDUCTIVE FASTENING SYSTEM AND METHOD FOR IMPROVED EME PERFORMANCE," the disclosures of which are incorporated by reference herein in their entireties.

FIG. 2 illustrates a schematic representation of an example internal locking structure 212 of internal locking structure 22 of external cap 17. FIG. 2 illustrates a cross-sectional schematic representation of the example internal locking structure 212 taken along cutting plane X-X in FIG. 1.

In the example of FIG. 2, the fastener 34 is illustrated extending into the nut 18, which is in turn included within the external cap 17. The nut 18 interacts with the external cap 17 via the internal locking structure 22. In the example of FIG. 2, the example internal locking structure 212 comprises a plurality of teeth 230 that interlock with a plurality of mating teeth 220 on the nut 18. In particular, the plurality of teeth 230 comprise tooth tips 232 that project towards the nut 18, and into corresponding recesses 224 in the nut 18 that exist between the plurality of mating teeth 220 of the nut 18. Similarly, the plurality of mating teeth 220 comprise tooth tips 222 that project towards the external cap 17 and into corresponding recesses 234 in the external cap 17 that exist between the plurality of teeth 230. Thus, the example internal locking structure 212 permits the nut 18 to rotate relative to the external cap 17 a threshold number of degrees. In particular, the nut 18 rotates until one or more of the plurality of mating teeth 220 run into, abut, and/or come into contact with one or more of the plurality of teeth 230 of the example internal locking structure 212. As explained above, the internal locking structure 22 prevents further rotation of the nut 18 unless the external cap 17 itself rotates as well.

Figure 3:
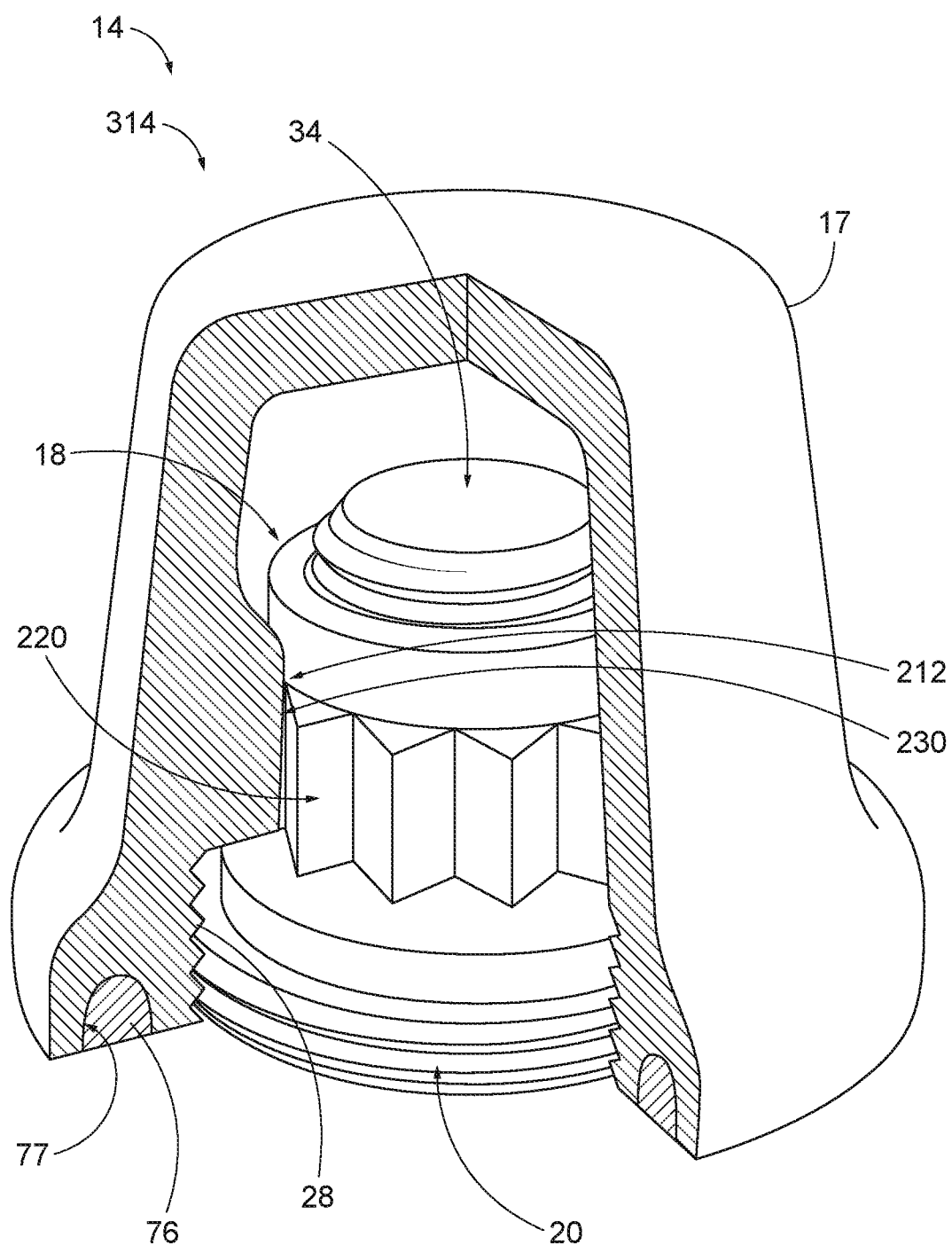
FIG. 3 is a fragmentary isometric side view of an example self-locking fastener mating assembly of a fuel tank access panel assembly, according to the present disclosure.

FIG. 3 shows a cutaway isometric side view of the example internal locking structure 212 of FIG. 2 included in an example self-locking fastener mating assembly 314. The example self-locking fastener mating assembly 314 is an example of the self-locking fastener mating assembly 14 of FIG. 1. Thus, the relative size, shape, configuration, geometry, and structure of the components of the self-locking fastener mating assembly 14 illustrated in FIG. 3 are merely exemplary since the example self-locking fastener mating assembly 314 is merely an example of the self-locking fastener mating assembly 14. As seen in FIG. 3, a portion of the external cap 17 is cut away to expose the internal components of the example self-locking fastener mating assembly 314. The internal locking structure 212 interacts with the plurality of mating teeth 220 of the nut 18 to restrict relative rotation of the nut 18. In particular, the example internal locking structure 212 extends in between the plurality of mating teeth 220 to prevent the nut 18 from rotating relative to the external cap 17 by more than a threshold amount.

Figure 4:
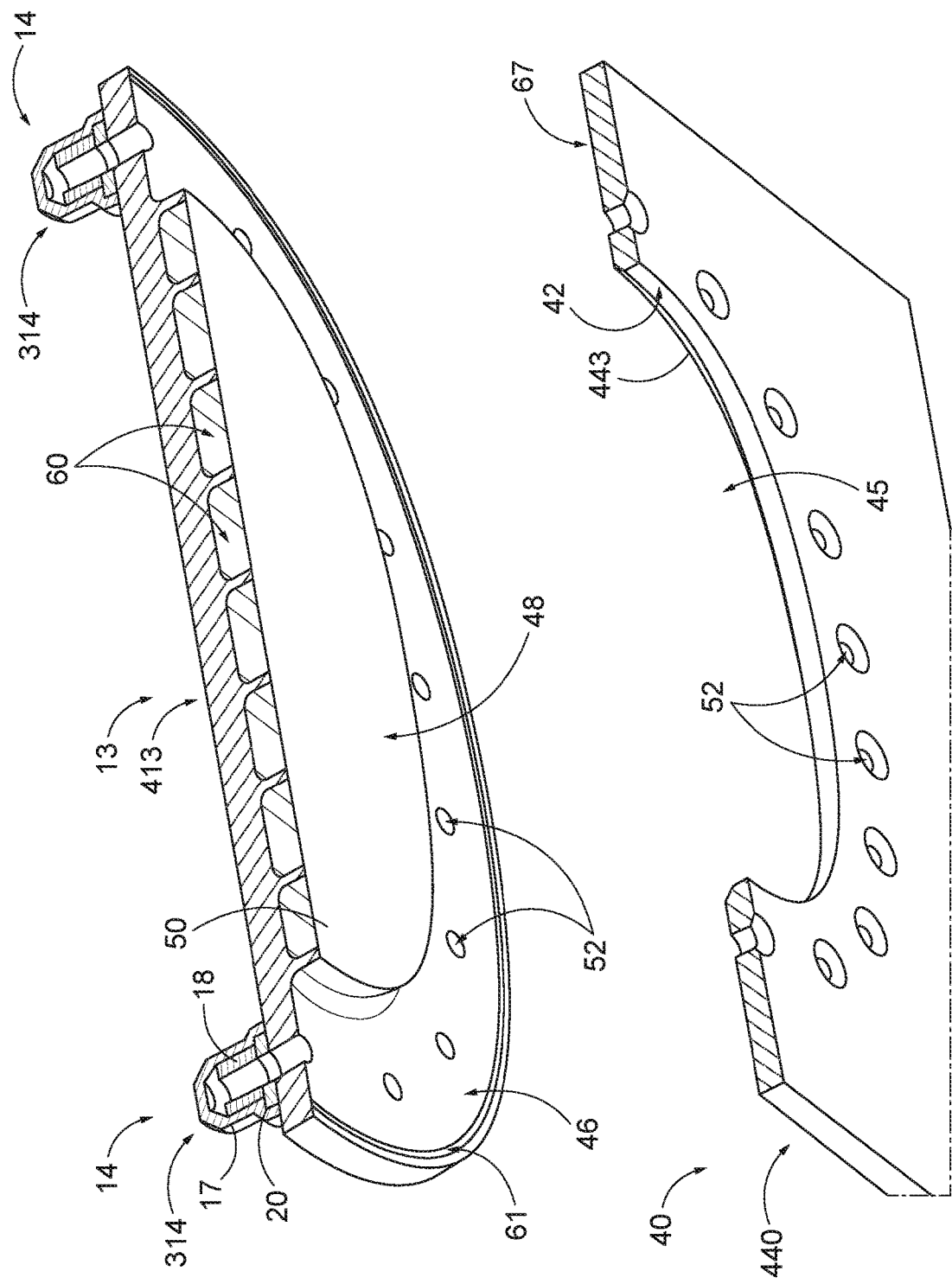
FIG. 4 is an exploded cross-sectional isometric bottom view of an example fuel tank access panel assembly that includes the example self-locking fastener mating assembly of FIG. 3, according to the present disclosure.
Figure 5:
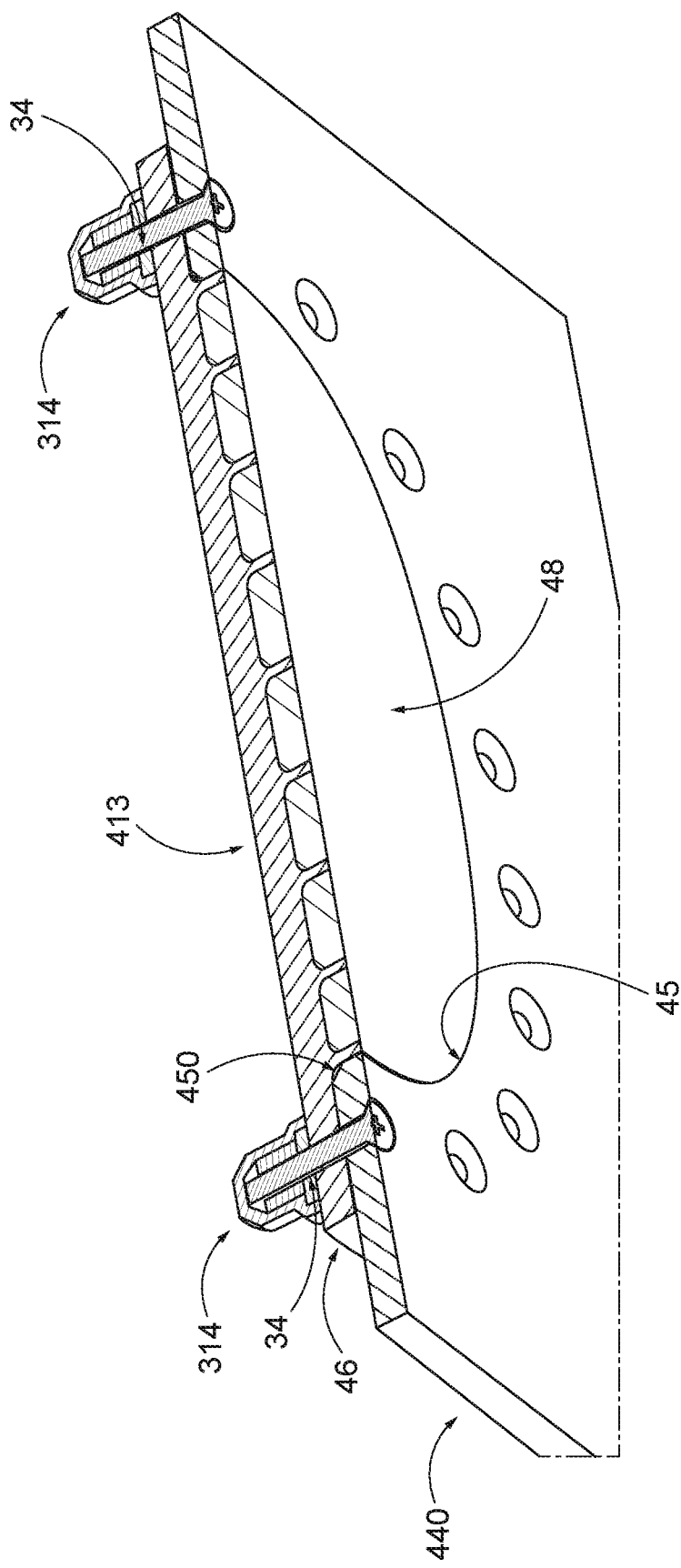
FIG. 5 is an assembled cross-sectional isometric bottom view of the example fuel tank access panel assembly of FIG. 4, according to the present disclosure.

FIGS. 4-5 illustrate isometric bottom views of an example skin 440 of skin 40 and an example access panel 413 of access panel 13. In particular, FIG. 4 illustrates an exploded view of the example skin 440 and the example access panel 413, and FIG. 5 illustrates an assembled view of the same. FIGS. 4-5 only show half of the roughly circular example access panel 413 and corresponding access panel hole 45 of the example skin 440.

As seen in FIG. 4, the example access panel 413 is substantially circular, and the peripheral groove 61 is also thus substantially circular since it extends around the periphery of the example access panel 413. The one or more voids 60 of the example access panel 413 are machined out of the example access panel 413 in a waffle grid formation. The edge 42 of the access panel hole 45 forms a chamfered corner 443 with the interior surface 67 of the example skin 440. The chamfered corner 443 is configured to provide relief for dielectric cover 44 and/or example access panel 413. In some examples, the chamfered corner 443 is formed by machining the example access panel 413.

As seen in FIG. 5, the body 48 of the example access panel 413 is sized to fit within the access panel hole 45 and a fastener 34 is inserted through the example skin 440 and the example access panel 413 into the example self-locking fastener mating assembly 314. In some examples, the body 48 directly abuts and/or physically contacts the example skin 440. In other examples, the body 48 does not directly abut and/or physically contact the example skin 440 and is spaced apart from the example skin 440 by a gap. However, in yet further examples, one or more intervening structures are included between the body 48 and the example skin 440. As one such example, a dielectric cover is positioned between the example skin 440 and the body 48 of the example access panel 413. The example skin 440 and the example access panel 413 form a rabbet joint 450. In particular, the lip 46 of the example access panel 413 extends over the top of the example skin 440, but the body 48 is substantially flush with the example skin 440. Thus, the lip 46 is recessed from the exterior surface of the body 48 and forms the rabbet joint 450 with the example skin 440.

FIG. 6 is a schematic illustration of an example aircraft 610 that includes fuel tank access panel assemblies according to the present disclosure. Example aircraft 610 generally may be utilized to transport persons and/or cargo. As illustrated in FIG. 6, example aircraft 610 generally includes a fuselage 612 and wings 614 operatively coupled to the fuselage 612. Engines 620 are coupled to the wings 614 and provide propulsion for the example aircraft 610. The wings 614 also include the access panel assembly 12, which provides access to the fuel tank. In some examples, and as illustrated in FIG. 6, the wings 614 include a plurality of the access panel assemblies 12 along the length of the wing 614 to provide access to different parts of the fuel tank.

Fuselage 612 and/or wings 614 define one or more wheel wells 616 (and/or landing gear storage bays and/or wheel storage bays) operatively coupled to and/or configured to receive a corresponding landing gear structure 618. Landing gear structure 618 may include wheels and a strut assembly.

FIG. 7 schematically provides a flowchart that represents illustrative, non-exclusive examples of methods according to the present disclosure. In FIG. 7, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 7 are not limiting and other methods and steps are within the scope of the present disclosure, including methods having greater than or fewer than the number of steps illustrated, as understood from the discussions herein.

At 702, methods 700 comprise coupling a fastener mating assembly (e.g., self-locking fastener mating assembly 14) to an access panel (e.g., access panel 13) prior to inserting the fastener into the fastener mating assembly. The methods 700 optionally comprise forming a lip (e.g., lip 46) around a periphery of the access panel that overlies a wing skin (e.g., skin 40) at 714. The lip is formed by removing a portion of the access panel, in some examples. In some such examples, the removing the portion of the access panel comprises creating a recess on an exterior-facing surface (e.g., exterior-facing surface 62) of the access panel, around the periphery of the access panel. In one such example, the lip is formed by machining the access panel. In still further examples, the forming at 714 additionally comprises hollowing out at least a portion of the body (e.g., body 48) of the access panel to form one or more voids (e.g., voids 60) in the body of the access panel. In particular, the one or more voids are created by machining the exterior-facing surface of the body of the access panel. In some examples, the methods 700 comprise forming a groove (e.g., groove 77) on a bottom of the lip and inserting a seal (e.g., sealant 76) into the groove at 724. In some examples, the groove extends around the periphery of the bottom of the lip. At 716, the methods 700 optionally comprise bonding a metal sheet (e.g., erosion cover 50) to an externally exposed face of the access panel (e.g., exterior-facing surface 62). In one such example, the metal sheet is bonded to the body of the access panel. At 722, the methods 700 optionally comprise applying a dielectric cover to an internal face of the access panel (interior-facing surface 63).

At 712, the methods 700 optionally comprise forming a hole (e.g., hole 52) in the lip of the access panel for receiving a fastener (e.g., fastener 34). In some examples, the hole is drilled, reamed, or otherwise formed in the access panel. Further, the methods 700 optionally comprise bonding an externally threaded washer (e.g., washer 20) to the access panel at 710. The bonding at 710 comprises fixedly coupling the washer to the access panel. Optionally, at 720, a nut (e.g., nut 18) is inserted in a cap (e.g., external cap 17) of a cap assembly (e.g., cap assembly 16) and the cap is optionally threaded onto the washer at 718. In some such examples, the cap is only partially threaded onto the washer at 718. In one such example, the threading the cap assembly onto the washer at 718 comprises rotating the cap in a first rotational direction such that the cap translates in a first axial direction towards the access panel and the washer.

In some examples, the bonding of the metal sheet at 716 is performed during co-curing of the access panel, prior to coupling the fastener mating assembly to the access panel at 702. Further, in examples where one or more of the optional steps 710, 712, 714, 718, 720, 722, and 724 are performed, the optional steps may be performed in the following order from first to last: 714, 722, 724, 712, 710, 720, and 718.

At 704, the methods 700 comprise preparing the wing skin for access panel assembly fastening. In particular, the preparing the wing skin for access panel fastening at 704 optionally comprises forming an access panel hole in the wing skin (e.g., access panel hole 45) for receiving the access panel at 726 and/or forming a fastener hole (e.g., fastener hole 52) in the skin that aligns with the hole in the lip of the access panel at 728. In one example, the access panel hole is integrally formed during manufacture of the skin. However, in other examples, the access panel hole is formed by cutting, reaming, and/or drilling the skin. The fastener hole is drilled, reamed, or other formed in the skin. The methods 700 optionally comprise applying a dielectric cover (e.g., dielectric cover 44) to the wing skin at 730. The applying the dielectric cover at 730 includes bonding the dielectric cover to the sidewalls of the access panel hole, in some examples.

At 706, the methods 700 comprise fastening the access panel to the wing skin. In particular, the fastening at 706 optionally comprises inserting the fastener initially through the wing skin at 732 from an exterior side of the wing skin, through the access panel, and into the cap assembly. At 734, the methods 700 optionally comprise screwing the fastener into the fastener mating assembly. The screwing the fastener into the fastener mating assembly at 734 comprises rotating the fastener in the first rotational direction. Screwing the fastener in the first rotational direction causes the cap and the fastener to translate in opposite axial directions, in some examples. In particular, when the cap is not fully threaded onto the washer, screwing the fastener in the first rotational direction causes the cap to thread farther onto the washer, and thus translate towards the access panel and the fastener, in some examples. Thus, in some such examples, screwing the fastener in the first rotational direction causes the fastener, the nut, and the cap to all rotate in the first rotational direction and fully threads the cap onto the washer.

Thus, in some examples, the rotating the fastener in the first rotational direction engages internal threads of an internal nut of the cap assembly and draws the cap towards the access panel. Further, in some examples, rotating the fastener in the first rotational direction causes the fastener, the nut, and the cap to all rotate in the first rotational direction. In still further examples, the rotating the fastener in the first rotational direction translates the fastener in a second axial direction that is opposite the first axial direction, and translates the cap farther in the first direction, such that screwing the fastener into the internal nut causes the cap and the fastener to translate in opposite axial directions, towards one another.

Illustrative, non-exclusive examples of inventive subject matter according to the present disclosure are described in the following enumerated paragraphs:

A1. An access panel assembly for an aircraft wing, the access panel assembly comprising:
an access panel comprising a hole configured to receive a fastener; and
a self-locking fastener mating assembly comprising:
a cap assembly comprising:
a nut comprising internal nut threads that mate with the fastener; and
an external cap that at least partially surrounds the nut, wherein the external cap comprises an internal locking structure that restricts rotation of the nut relative to the external cap, and wherein the external cap further comprises internal cap threads of an opposite handedness as the internal nut threads of the nut; and
a washer fixedly coupled to the access panel, the washer comprising external threads that mate with the internal cap threads of the external cap.

A2. The access panel assembly of paragraph A1, wherein the access panel is constructed from a fiber reinforced plastic.

A3. The access panel assembly of any of paragraphs A1-A2, wherein the access panel comprises a central body portion that is configured to be positioned within an access panel opening of a skin of the aircraft wing when the access panel is coupled to the skin, and a lip portion that is configured to extend over an interior-facing surface of the skin when the access panel is coupled to the skin.

A4. The access panel assembly of paragraph A3, wherein at least a portion of the central body portion defines one or more voids.

A5. The access panel assembly of any of paragraphs A3-A4, wherein the lip portion further comprises a peripheral groove in an exterior-facing surface of the lip portion that interfaces with the skin of the aircraft wing.

A6. The access panel assembly of paragraph A5, further comprising an annular seal configured to provide a seal between the exterior-facing surface of the lip portion and the skin of the aircraft wing, wherein the annular seal is retained within the peripheral groove of the lip portion.

A7. The access panel assembly of any of paragraphs A3-A6, further comprising a cover fixedly coupled to an exterior-facing surface of a central region of the access panel.

A8. The access panel assembly of paragraph A7, wherein an exterior cover surface of the cover is configured to be flush with an exterior skin surface of the skin of the aircraft wing when the access panel assembly is coupled to the skin.

A9. The access panel assembly of any of paragraphs A1-A8, further comprising the fastener.

A10. The access panel assembly of paragraph A9, wherein the fastener comprises a conductive coating.

A11. The access panel assembly of any of paragraphs A9-A10 when depending from paragraphs A3-A8, wherein the lip portion comprises the hole configured to receive the fastener, and wherein the fastener extends through the hole and into the self-locking fastener mating assembly to couple the access panel assembly to the aircraft wing.

A12. The access panel assembly of any of paragraphs A9-A11, wherein the fastener comprises external fastener threads of an opposite handedness as the external threads of the washer, wherein the external fastener threads are configured to mate with the internal nut threads of the nut such that the fastener screws into the nut.

A13. The access panel assembly of any of paragraphs A3-A12, further comprising a conductive gap filler applied to the hole of the lip portion of the access panel.

A14. The access panel assembly of any of paragraphs A1-A13, further comprising a dielectric cover fixedly coupled to the access panel.

A15. The access panel assembly of any of paragraphs A1-A14, wherein the external cap is constructed from a polyamide.

A16. The access panel assembly of any of paragraphs A1-A15, wherein the external cap defines an interior volume, and wherein the nut is positioned within the interior volume.

A17. The access panel assembly of paragraph A16, wherein the cap assembly further comprises an ice prevention structure positioned within the interior volume of the external cap, and opposite the washer.

A18. The access panel assembly of any of paragraphs A1-A17, wherein the nut comprises an external surface that is opposite the internal nut threads and faces an internal surface of the external cap, wherein the internal locking structure of the external cap is positioned on the internal surface of the external cap, and wherein the external surface of the nut is non-circular such that at least a portion of the external surface interacts with the internal locking structure to restrict rotation of the nut relative to the external cap.

A19. The access panel assembly of any of paragraphs A1-A18, wherein the cap assembly further comprises a sealant positioned between the external cap and the access panel.

A20. The access panel assembly of paragraph A19, wherein the external cap further comprises a groove on a bottom surface of the external cap that interfaces with the access panel, and wherein the sealant is included in the groove.

A21. The access panel assembly of any of paragraphs A1-A20 wherein the external cap and the access panel are not integrally formed together, and wherein the external cap is coupled to the access panel via the internal cap threads and the external threads of the washer.

B1. An access panel assembly for an aircraft wing, the access panel assembly comprising:
an access panel; and
a self-locking fastener mating assembly comprising:
a washer fixedly coupled to the access panel; and
a cap assembly in a self-locking coupling arrangement with the washer, wherein the self-locking coupling arrangement is characterized in that rotating and pushing a fastener into the cap assembly generates a compressive force between the cap assembly and the access panel.

B2. The access panel of paragraph B1, further comprising the subject matter of any of paragraphs A1-A22.

C1. An aircraft comprising:
a wing; and
the access panel assembly of any of paragraphs A1-B2, wherein the access panel is operatively coupled to the wing.

D1. An aircraft wing comprising:
a skin;
a fuel tank access panel comprising a lip overlying at least a portion of the skin; and
a fastener assembly comprising:
a self-locking fastener mating assembly comprising internal threads; and
a fastener extending through the skin and the fuel tank access panel and into the self-locking fastener mating assembly, wherein the fastener comprises external threads that mate with the internal threads of the self-locking fastener mating assembly; and wherein
the self-locking fastener mating assembly comprises a self-locking mechanism that is configured to tighten the self-locking fastener mating assembly to the fuel tank access panel responsive to the fastener being threaded through the internal threads.

D2. The aircraft wing of paragraph D1, wherein the skin comprises an external-facing surface that faces an exterior of the wing and an internal-facing surface opposite the external-facing surface, wherein the internal-facing surface faces an interior of the wing, and wherein the access panel is configured to not engage the external-facing surface of the skin when the access panel assembly is coupled to the skin.

D3. The aircraft wing of any of paragraphs D1-D2, further comprising a dielectric cover fixedly coupled to the skin, between the skin and at least a portion of the access panel.

E1. A method comprising:
coupling a fastener mating assembly to an access panel prior to fastening the access panel to a skin of an aircraft wing.

E2. The method of paragraph E1, wherein the coupling the fastener mating assembly to the access panel comprises:
coupling the fastener mating assembly to the access panel prior to fastening the fastener mating assembly to the skin of the aircraft wing, wherein the coupling the fastener mating assembly to the access panel comprises:
fixedly coupling a washer comprising external washer threads of a first handedness to an interior-facing surface of the access panel; and
threading a cap of a cap assembly onto the external washer threads of the washer from the interior-facing surface of the access panel by rotating the cap in a first rotational direction such that the cap translates in a first axial direction towards the access panel.

E3. The method of paragraph E2, further comprising fastening the access panel to the skin of the aircraft wing by rotating a fastener in the first rotational direction.

E4. The method of paragraph E3, wherein the rotating the fastener in the first rotational direction engages internal threads of an internal nut of the cap assembly and draws the cap towards the access panel.

E5. The method of any of paragraphs E3-E4, wherein the threading the cap onto the external washer threads of the washer comprises only partially threading the cap onto the washer, and wherein the rotating the fastener in the first rotational direction fully threads the cap onto the washer.

E6. The method of any of paragraphs E3-E5, wherein the rotating the fastener in the first rotational direction causes the fastener, the nut, and the cap to all rotate in the first rotational direction.

E7. The method of any of paragraphs E3-E6, wherein the rotating the fastener in the first rotational direction translates the fastener in a second axial direction that is opposite the first axial direction, and translates the cap farther in the first direction, such that screwing the fastener into the internal nut causes the cap and the fastener to translate in opposite axial directions, towards one another.

E8. The method of any of paragraphs E2-E7, wherein the cap has a groove, and wherein the method further comprises filling the groove with a sealant.

E9. The method of any of paragraphs E1-E8, further comprising cutting a rabbet on an exterior-facing surface of the access panel.

E10. The method of any of paragraphs E1-E9, further comprising forming the groove around a periphery of an exterior-facing surface of the access panel, and inserting the sealant into the groove.

E11. The method of any of paragraphs E1-E10, further comprising hollowing out at least a portion of the access panel.

E12. The method of any of paragraphs E1-E11, further comprising fixedly coupling a cover to an exterior-facing surface of the access panel.

E13. The method of any of paragraphs E1-E12, further comprising applying a dielectric cover to the access panel.

E14. The method of any of paragraphs E1-E13, further comprising forming a hole in the access panel for receiving the fastener.

E15. The method of any of paragraphs E1-E14, further comprising assembling the access panel with the skin of the aircraft wing in a rabbet joint.

E16. The method of paragraph E15, further comprising applying a dielectric cover to the skin of the aircraft wing, between the skin and the access panel.

E17. The method of any of paragraphs E15-E16, further comprising fastening the access panel to the skin from only an exterior side of the skin.

E18. The method of paragraph E17, wherein the fastening comprises inserting the fastener first through the skin of the aircraft wing, then through the access panel from the exterior-facing surface of the access panel that is opposite the interior-facing surface of the access panel, and then into the internal nut of the cap assembly.

F1. An aircraft wing comprising:
a skin comprising a fuel tank access panel hole and a first fastener hole configured to receive a fastener; and
a load bearing fuel tank access panel assembly fastened to the skin and configured to bear at least some of a bending load of the aircraft wing.

F2. The aircraft wing of paragraph F1, wherein the load bearing fuel tank access panel assembly comprises:
an access panel comprising:
  a body portion configured to be received in the fuel tank access panel hole; and
  a lip portion extending over an interior surface of the skin, the lip portion comprising a second fastener hole configured to receive the fastener, wherein the first fastener hole and the second fastener hole comprise an electrically conductive gap filler; and
a self-locking fastener mating assembly operatively coupled to the lip portion of the access panel assembly, wherein the self-locking fastener mating assembly is configured to receive and secure the fastener.

F3. The aircraft wing of paragraph F2, further comprising the fastener, wherein the fastener extends through the first fastener hole of the skin and the second fastener hole of the access panel, into the self-locking fastener mating assembly, and wherein the fastener comprises an electrically conductive coating.

F4. The aircraft wing of any of paragraphs F1-F3, further comprising the subject matter of any of paragraphs A1-D3.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer to, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An access panel assembly for an aircraft wing, the access panel assembly comprising:
an access panel comprising a hole configured to receive a fastener; and
a self-locking fastener mating assembly comprising:
  a cap assembly comprising:
    a nut comprising internal nut threads that mate with the fastener; and
    an external cap that at least partially surrounds the nut, wherein the external cap comprises an internal locking structure that restricts rotation of the nut relative to the external cap, and wherein the external cap further comprises internal cap threads of an opposite handedness as the internal nut threads of the nut; and
  a washer fixedly coupled to the access panel, the washer comprising external washer threads that mate with the internal cap threads of the external cap.

2. The access panel assembly of claim 1, wherein the nut comprises an external surface that is opposite the internal nut threads and faces an internal surface of the external cap, wherein the internal locking structure of the external cap is positioned on the internal surface of the external cap, and wherein the external surface of the nut is non-circular such that at least a portion of the external surface interacts with the internal locking structure to restrict rotation of the nut relative to the external cap.

3. The access panel assembly of claim 1, wherein the access panel comprises:
a central body portion that is configured to be positioned within an access panel opening of a skin of the aircraft wing when the access panel is coupled to the skin, and
a lip portion that is configured to extend over an interior-facing surface of the skin when the access panel is coupled to the skin.

4. The access panel assembly of claim 3, wherein the lip portion comprises a peripheral groove in an exterior-facing surface of the lip portion that interfaces with the skin of the aircraft wing, and wherein the access panel assembly further comprises an annular seal configured to provide a seal between the exterior-facing surface of the lip portion and the skin of the aircraft wing, wherein the annular seal is retained within the peripheral groove of the lip portion.

5. The access panel assembly of claim 3, wherein the lip portion comprises the hole, and wherein the access panel assembly further comprises a conductive gap filler applied to one or more of the hole of the lip portion of the access panel and the skin.

6. The access panel assembly of claim 3, further comprising the fastener, and wherein the lip portion comprises the hole configured to receive the fastener, and wherein the fastener extends through the hole and into the self-locking fastener mating assembly to couple the access panel assembly to the aircraft wing.

7. The access panel assembly of claim 6, wherein the fastener comprises external fastener threads of an opposite handedness as the external washer threads, wherein the external fastener threads are configured to mate with the internal nut threads of the nut such that the fastener screws into the nut.

8. The access panel assembly of claim 6, wherein the fastener comprises an electrically conductive coating.

9. The access panel assembly of claim 1, further comprising a dielectric cover fixedly coupled to the access panel.

10. The access panel assembly of claim 1, wherein the external cap is constructed from a polyamide.

11. The access panel assembly of claim 1, wherein the external cap and the access panel are not integrally formed together, and wherein the external cap is coupled to the access panel via the internal cap threads and the external washer threads.

12. The access panel assembly of claim 1, wherein the access panel is constructed from a fiber reinforced plastic.

13. A method of installing the access panel assembly of claim 1 to the aircraft wing, the method comprising:
 coupling the self-locking fastener mating assembly to the access panel prior to fastening the self-locking fastener mating assembly to a skin of the aircraft wing, wherein the coupling the self-locking fastener mating assembly to the access panel comprises:
  fixedly coupling the washer to an interior-facing surface of the access panel, wherein the external washer threads have a first handedness; and
  threading the external cap of the cap assembly onto the external washer threads of the washer from the interior-facing surface of the access panel by rotating the cap in a first rotational direction such that the cap translates in a first axial direction towards the access panel.

14. The method of claim 13, further comprising fastening the access panel to the skin of the aircraft wing by rotating the fastener in the first rotational direction.

15. The method of claim 14, wherein the threading the external cap onto the external washer threads of the washer comprises only partially threading the external cap onto the washer, and wherein the rotating the fastener in the first rotational direction fully threads the external cap onto the washer.

16. The method of claim 14, wherein the fastening the access panel to the skin comprises fastening the access panel to the skin from only an exterior side of the skin, and wherein the fastening the access panel to the skin further comprises inserting the fastener first through the skin of the aircraft wing, then through the access panel from an exterior-facing surface of the access panel that is opposite the interior-facing surface of the access panel, and then into an internal nut of the cap assembly.

17. The method of claim 13, further comprising assembling the access panel with the skin of the aircraft wing in a rabbet joint.

18. The method of claim 13, further comprising applying a dielectric cover to the skin of the aircraft wing, between the skin and the access panel.

19. An aircraft wing comprising:
 a skin comprising a fuel tank access panel hole and a first fastener hole; and
 the access panel assembly of claim 1 fastened to the skin, wherein the access panel assembly is configured to bear at least some of a bending load of the aircraft wing.

20. The aircraft wing of claim 19, wherein the nut comprises an external surface that is opposite the internal nut threads and faces an internal surface of the external cap, wherein the internal locking structure of the external cap is positioned on the internal surface of the external cap, and wherein the external surface of the nut is non-circular such that at least a portion of the external surface interacts with the internal locking structure to restrict rotation of the nut relative to the external cap.

* * * * *